Feb. 14, 1950 L. WETHERILL 2,497,708
APPARATUS FOR MAKING HIGH-FREQUENCY CABLE JOINTS
Original Filed Feb. 21, 1945 2 Sheets-Sheet 1
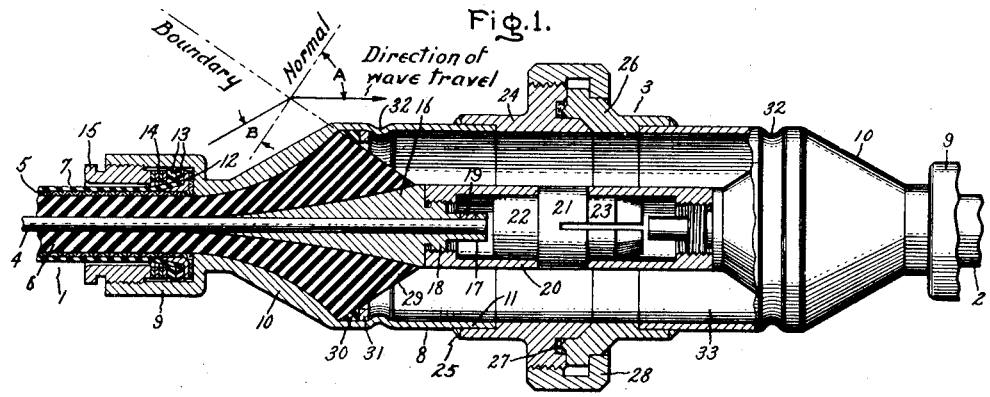
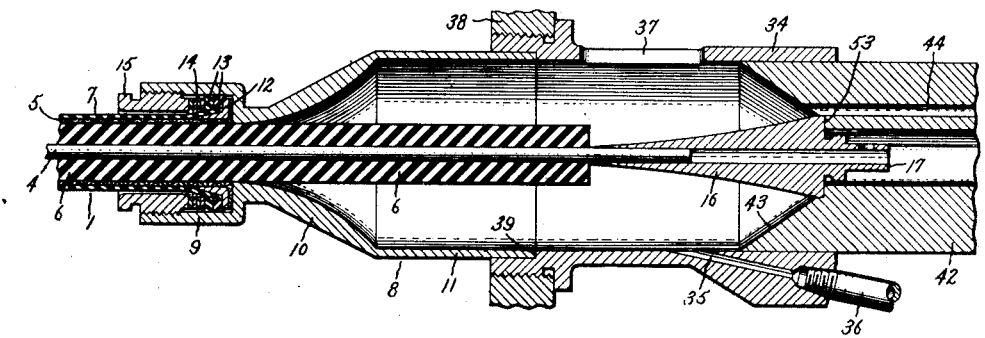
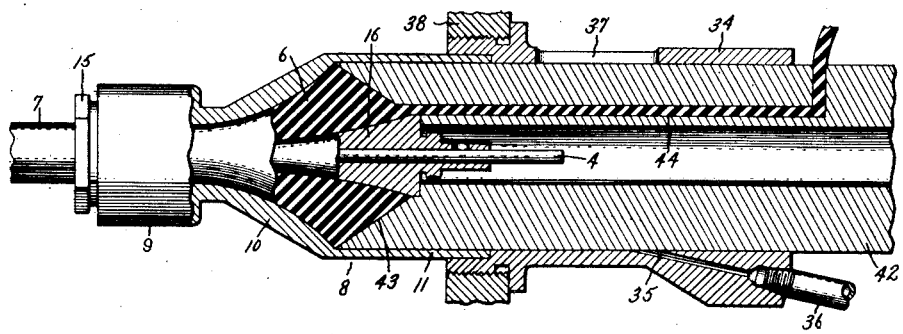
Inventor:
Lynn Wetherill,
by Ernest C. Britton
His Attorney Feb. 14, 1950
L. WETHERILL
2,497,708
APPARATUS FOR MAKING HIGH-FREQUENCY CABLE JOINTS
Original Filed Feb. 21, 1945
2 Sheets-Sheet 2
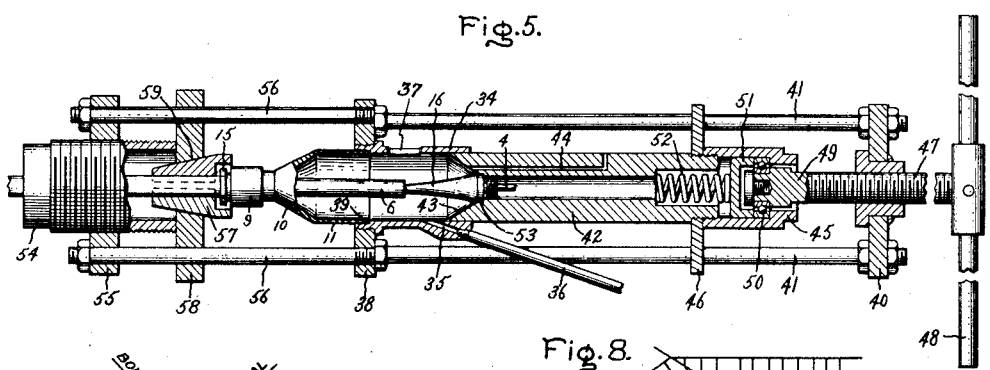
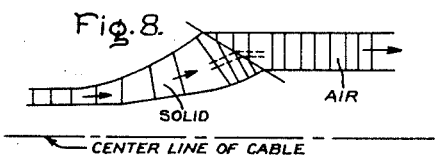
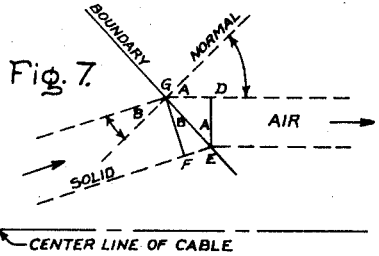
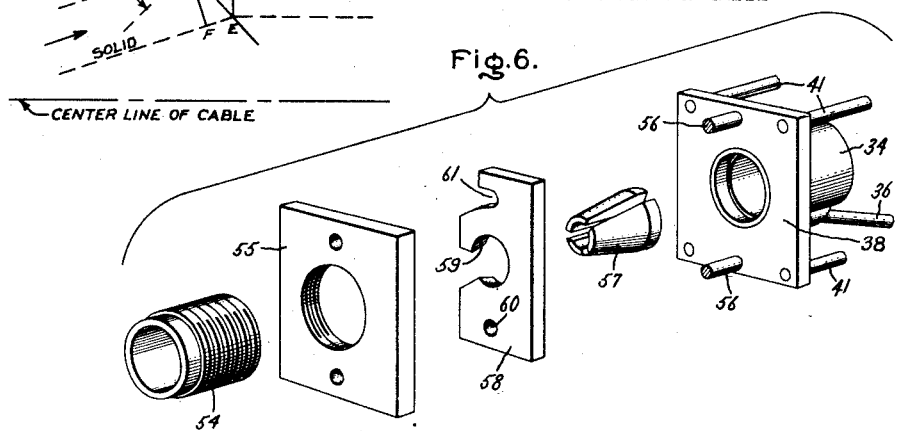
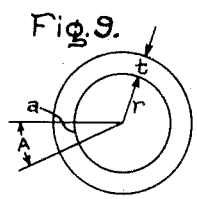
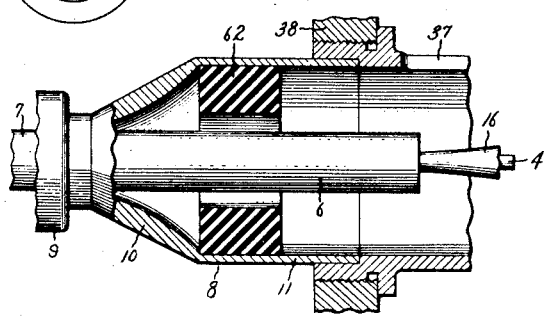
Inventor:
Lynn Wetherill,
by Ernest C. Britton
His Attorney.

Patented Feb. 14, 1950

2,497,708

UNITED STATES PATENT OFFICE 2,497,708

APPARATUS FOR MAKING HIGH-FREQUENCY CABLE JOINTS

Lynn Wetherill, Pittsfield, Mass., assignor to General Electric Company, a corporation of New York Application May 15, 1946, Serial No. 669,857, which is a division of application Serial No. 578,965, February 21, 1945. Divided and this application September 29, 1947, Serial No. 776,822

3 Claims. (Cl. 18—36)

My invention relates to electric cable joints in the form of connectors for making joints between lengths of various types of cable. More specifically, the invention relates to apparatus for constructing connectors for cables which are particularly adapted for the transmission of high frequency currents of the order of several hundred megacycles. This application is a division of my copending application for "Apparatus for making high-frequency cable joint," Serial No. 669,-857, filed May 15, 1946, which is a division of my copending application for "Electric cable and cable joint," Serial No. 578,965, filed February 21, 1945, and assigned to the same assignee as the instant application.

My invention is of particular interest in connection with cables having solid dielectric medium between the inner and outer conductors in which lengths of the cable are connected to other cables by means of connectors employing different dielectric medium from that used in the cable. Sometimes joints using a solid dielectric medium may be used but usually the medium is gaseous, such as air. One advantage of using air as the dielectric medium at the cable joint is that it permits quick assembling and dismantling of such cable connections in field use. At the same time, the connection or joint between cable sections must be so constructed that the separable parts thereof may be quickly and easily attached to lengths of cable cut from bulk stock.

It is of particular importance in cable lengths used with high frequency currents that the characteristic impedance, or surge impedance, of the cable be uniform throughout its length irrespective of variations in the dielectric media used in adjacent sections of cable, and in the joints connecting these sections, and irrespective of variations in the diameters of the inner and outer conductors. Such variations in diameters almost invariably occur at points where joints are placed in the cable length in order to secure uniform breakdown strength in the dielectric medium.

The requirement of constant surge impedance alone will not suffice to give highest efficiency in a high frequency transmission line incorporating joints. I have found that it is also important to so construct the cable joint that no reflection of the high frequency waves occurs at faces between different dielectric media, particularly where the diameters of the inner and outer conductors have been changed as at the cable joint. Otherwise, spurious or unwanted standing waves may result with consequent loss of power in the transmission line.

It is an object of my invention to provide a new and improved apparatus for making a cable joint of the type described.

In the accompanying drawing, Fig. 1 illustrates a cable and a joint therefor constructed in accordance with my invention; Figs. 2 and 3 illustrate successive steps in the method of forming the cable joint; Fig. 4 illustrates a modification of the cable forming method; Fig. 5 illustrates apparatus for carrying out the method according to my invention; Fig. 6 is an exploded view of parts of the apparatus of Fig. 5; and Figs. 7, 8 and 9 are diagrammatic views illustrating the principles by which electric energy is transmitted through a high frequency cable and joint constructed according to my invention.

It is well known that the characteristic impedance, or surge impedance, Z of an electric cable or of any small part thereof may be expressed as $$Z = \sqrt{\frac{L}{C}}$$

in which

L = inductance in henries per unit length
C = capacitance in farads per unit length This term may also be expressed as $$Z = \frac{60}{\sqrt{k}} \log_e \frac{R}{r}$$

in which $k$ = dielectric constant of the insulating medium between the inner and outer conductors
R = inner diameter of the outer conductor and
$r$ = outer diameter of the inner conductor From this formula, it will be seen that the characteristic impedance of the cable is a function of three variables $k$, R and $r$. If any one of these variables is changed, a corresponding change will be necessary in the remaining variables if the characteristic impedance of the cable is to be maintained constant throughout its length.

In cases where it is desired to utilize cable joints having separable connectors for taking lengths of cable apart, provision must be made for connecting together the inner and outer conductors of the cable length. This means that some form of connector must be fastened to the inner conductor. Almost invariably the connector is of a diameter greater than that of the inner conductor of the high frequency cable. Furthermore, it is highly desirable to employ a gas insulating medium, such as air, at the cable joint so that no difficulty will be experienced in taking the joint apart in field use. It will thus be seen that if the equation $$Z = \frac{60}{\sqrt{k}} \log_e \frac{R}{r}$$

is to be followed throughout the entire length of the cable, including the cable joints, variations in the size of the inner and outer conductors will occur at the cable joints and also the spacing between the conductors will vary because the dielectric constant of the insulating medium between the conductors has been changed.

In the form of my invention illustrated, I have shown a coaxial high frequency cable in which a solid dielectric medium is employed, such as polyethylene. This material has a dielectric constant of about 2.4. Furthermore, I have chosen to illustrate such a cable as being provided with connectors forming a cable joint in which air is utilized as a gaseous dielectric medium between the inner and outer conductors. The dielectric constant of air is 1. Since the dielectric constant of air is less than that of polyethylene, the ratio $R/r$ in the joint must be smaller than for the cable. Since dielectric strength of air is less than that of polyethylene, the spacing between the conductors at the joint must be increased in order not to lower the overall dielectric strength of the cable. However, the diameters of the inner and outer conductors of the cable have been so chosen in relation to the dielectric medium as to make the characteristic impedance of the joint substantially equal to that of the cable. In order to match the characteristic or surge impedance of the joint to that of the cable, and in order to connect the large diameter conductors of the joint to the relatively smaller conductors of the cable, a portion of the joint is formed with tapered conductors so that the diameters and spacing of the conductors of the cable are gradually increased to those of the joint. This arrangement is shown by Fig. 1.

Although the characteristic impedance of the joint has been matched to that of the cable, this requirement alone is not sufficient to attain maximum efficiency in the transmission line. It is also important to so construct the cable joint that no reflections of high frequency waves occur as the wave passes down the cable. Heretofore, the dielectric medium in the cable has been terminated abruptly whenever the cable has been connected to a joint having a different dielectric medium. This has almost invariably resulted in reflection of part of the wave in those instances in which there is a change in the diameters of the inner and outer conductors at cable joints. However, I have found that the interface between the two dielectric mediums of the cable and joint may be so positioned as to substantially preclude reflections of the high frequency wave and at the same time give a substantially constant surge impedance at the joint. The wave is refracted so that it passes from one dielectric medium to the other with substantially no reflection. The arrangement is particularly useful in those instances in which the diameter of the cable joint varies from that of the cable and in which tapered conductors are used in the joint to obtain a uniform characteristic impedance of the transmission line.

In Fig. 1 of the drawing, I have shown a cable and joint therefor in which a portion of the solid dielectric of the cable has been extended up into the cable joint and terminated at an interface or boundary disposed at an angle. This angle is critical. It depends upon the dielectric constants of the insulating materials used in the cable and joint. It is so located as to keep the characteristic impedance of the cable substantially constant through the joint as well as precluding reflections of the high frequency wave. In order to more fully explain the manner in which the angle of the boundary is determined, I have shown the arrangement of the dielectric media and boundary in the diagrammatic views of Figs. 7 and 8.

In Fig. 9, the high frequency wave is represented as parallel lines moving along the paths of the dielectric media. It remains as nearly as possible perpendicular to the boundaries formed by the conducting surfaces. The wave is shown moving along the solid dielectric until it reaches the boundary where it is refracted as it passes into the gaseous dielectric medium. As mentioned above, the boundary angle is critical in order to secure proper refraction of the wave. In order to illustrate the boundary angle, a small portion of the wave front and boundary angle, as indicated by the dotted lines in Fig. 8, have been shown in the enlarged schematic view of Fig. 7.

Fig. 7 illustrates the boundary plane separating the two dielectric media which are indicated by the parallel dotted lines. The dotted lines also represent the path of the high frequency wave. In Fig. 7, B = angle of incidence of the wave
A = angle of refraction of the wave.

It is assumed that $V_1$ = velocity of wave in insulating material entering boundary
$V_2$ = velocity of wave in insulating material leaving boundary.

By the sine law of refraction $$\frac{V_2}{V_1} = \frac{\sin A}{\sin B}$$

Since the velocity of an electric wave is inversely proportional to the square root of the dielectric constant $$V_1 = \frac{1}{\sqrt{K_1}}$$

where $K_1$ = dielectric constant of insulating material on entering side of boundary (side of incidence).

$$V_2 = \frac{1}{\sqrt{K_2}}$$

where $K_2$ = dielectric constant of insulating material on other side of boundary (side of refraction).

Substituting $$\frac{1}{\sqrt{K}}$$

for V in the sine law equation, it is found that $$\frac{\sqrt{K_1}}{\sqrt{K_2}} = \frac{\sin A}{\sin B}$$

or $$\sqrt{\frac{K_1}{K_2}} = \frac{\sin A}{\sin B}$$

Thus, it is seen that to secure proper refraction of the wave the angles A and B are determined by the square root of the ratio of the dielectric constants for the insulating materials used on each side of the boundary.

In meeting the requirement for constant surge impedance on each side of the boundary, reference is made to the formula for surge impedance already mentioned in which $$Z = \frac{60}{\sqrt{K}} \log_e \frac{R}{r}$$

From this equation, it will be apparent that the surge impedance Z is inversely proportional to $$\sqrt{K}$$

However, the equation just mentioned is that for the surge impedance of a cylindrical cable. On the other hand, the diagrammatic view of Fig. 7 shows a small rectangular strip of a dielectric medium with conductors on opposite faces. In the equations to follow, the surge impedance for such a small rectangular strip will be derived from the equation for the surge impedance of a cylindrical cable.

Referring to Fig. 9, it will be apparent from the formula given for the surge impedance of a cable that $$Z = \frac{60}{\sqrt{K}} \log_e \frac{r+t}{r}$$

in which $r$ = the radius of the inner conductor
$r+t$ = the radius of the outer conductor.

As angle A in Fig. 9 grows smaller and smaller, the volume of dielectric material contained in the angle will approach a rectangular prism. The angle A includes a length $a$ on the circumference of circle having radius $r$ so that the surge impedance of the volume in angle A is $$Z_A = \frac{2\pi r}{a} \times \frac{60}{\sqrt{K}} \log_e \left(1 + \frac{t}{r}\right)$$

Let $r \to \infty$ $$\log_e \left(1 - \frac{t}{r}\right) \to \frac{t}{r}$$

$$Z_A = \frac{2\pi r}{a} \times \frac{60}{\sqrt{K}} \times \frac{t}{r} = \frac{120\pi t}{a\sqrt{K}}$$

if $a = 1$ $$Z_A = \frac{120\pi t}{\sqrt{K}}$$

Since the quantity $120\pi$ is a constant $$Z_A = \frac{t}{\sqrt{K}}$$

By comparing Figs. 9 and 7, it will be apparent that the distance $t$ in Fig. 9 corresponds to GF in Fig. 7. Assuming that $Z_1$ = surge impedance on the entering side of the boundary
$Z_2$ = surge impedance on the opposite side of the boundary,
then $$Z_1 = \frac{t}{\sqrt{K_1}} = \frac{GF}{\sqrt{K_1}}$$

$$Z_2 = \frac{t}{\sqrt{K_2}} = \frac{DE}{\sqrt{K_2}}$$

or $$\frac{\sqrt{K_1}}{\sqrt{K_2}} = \frac{GF}{DE} = \frac{\cos B}{\cos A}$$

$$\sqrt{\frac{K_1}{K_2}} = \frac{\cos B}{\cos A}$$

Since for constant surge impedance $$\sqrt{\frac{K_1}{K_2}} = \frac{\cos B}{\cos A}$$

and for proper refraction of the wave $$\sqrt{\frac{K_1}{K_2}} = \frac{\sin A}{\sin B}$$

these two equations may be solved simultaneously to incorporate both factors in determining the ultimate values of angles A and B. Thus $$\sqrt{\frac{K_1}{K_2}} = \frac{\cos B}{\cos A} = \frac{\sin A}{\sin B}$$

Let $r = \sqrt{\frac{K_1}{K_2}}$ $$r = \frac{\cos B}{\cos A} \qquad\qquad r = \frac{\sin A}{\sin B}$$

$$r^2 \cos^2 A = \cos^2 B \qquad \sin^2 B = \frac{\sin^2 A}{r^2}$$

$$r^2 \cos^2 A + \frac{\sin^2 A}{r^2} = \cos^2 B + \sin^2 B = 1$$

$$\frac{1}{r^2}(\cos^2 A + \sin^2 A) + \left(r^2 - \frac{1}{r^2}\right)\cos^2 A = 1$$

$$\frac{1}{r^2} + \left(r^2 - \frac{1}{r^2}\right)\cos^2 A = 1$$

$$\cos^2 A = \left(1 - \frac{1}{r^2}\right) / \left(r^2 - \frac{1}{r^2}\right) = \frac{r^2 - 1}{r^4 - 1} = \frac{1}{r^2 + 1}$$

$$\cos A = \sqrt{\frac{1}{r^2 + 1}} \qquad\qquad \text{(Equation 1)}$$

By trigonometry $$\tan A = \frac{\sqrt{1 - \cos^2 A}}{\cos A}$$

Substituting Equation 1

$$\tan A = \frac{\sqrt{1 - \frac{1}{r^2+1}}}{\sqrt{\frac{1}{r^2+1}}} = \sqrt{\frac{r^2+1-1}{1}}$$

$$\tan A = r = \sqrt{\frac{K_1}{K_2}}$$

Thus $$\sqrt{\frac{K_1}{K_2}} = \tan A = \frac{\sin A}{\cos A}$$

But by the previous equation $$\sqrt{\frac{K_1}{K_2}} = \frac{\cos B}{\cos A}$$

Comparing the two equations $$\sin A = \cos B$$

$$A = \frac{\pi}{2} - B$$

$$\tan A = \cot B = \sqrt{\frac{K_1}{K_2}}$$

This solution gives values for angles A and B such that $$\tan A = \sqrt{\frac{K_1}{K_2}}$$

$$\cot B = \sqrt{\frac{K_1}{K_2}}$$

Thus it will be seen that the boundary angle is determined by the ratio of the dielectric constants of the insulating materials on each side of the boundary. For the special case in which air, having a dielectric constant of 1, is used on one side of the boundary the expression $$\sqrt{\frac{K_1}{K_2}} \text{ becomes } \sqrt{K_1} \text{ since } K_2=1$$

In the showing of Figs. 1, 7 and 8, and in the mathematical steps set forth above, the electric wave has been considered as passing from a solid dielectric medium into a gaseous one. This has been done in the interest of simplification and to make the functions of the boundary more clearly apparent. However, it should be realized that the electric wave also travels in a reverse direction, i.e., from the gaseous to the solid dielectric medium. In such instances, the angles A and B in the equations mentioned above would be reversed. Similarly, $Z_1$ and $Z_2$ would be reversed as would $K_1$ and $K_2$.

Turning now to the actual construction of my invention shown by Fig. 1, two cable sections 1 and 2 are joined together with a connector 3. Each cable section has an inner conductor 4 and an outer conductor 5, in the present instance made of braided material and concentrically spaced from the inner conductor 4. The annular space between the conductors is filled with insulating material, in the present example, a solid dielectric 6, such as polyethylene. The outer conductor 5 is protected by a jacket 7 made from suitable material such as polyvinyl chloride.

The connector 3 for connecting two cable sections 1 and 2 is made up of two terminals and includes means for securing and electrically connecting such terminals together. Each terminal comprises a casing 8 which has a substantially cylindrical end portion 9, a substantially conical or tapered intermediate portion 10 and a substantially cylindrical end portion 11. The cylindrical casing portion 9 forms a packing chamber to receive the severed end of the cable. A braid clamp 12 is located in said chamber between an outwardly turned portion of the braided outer conductor and the jacket 7. The jacket 7 is securely sealed to the casing 9 and the outer conductor 5 is securely connected to the casing 9 by means of suitable packing rings 13 and washers 14 held in position by a gland nut 15 threaded into the casing 9. In this way, the outer conductor 5 is electrically connected to the joint casing 8.

The inner conductor 4 within the end casing 11 carries a metallic cone 16 which has its apex near the casing portion 9 and its base within the cylindrical casing portion 11. The surface of the cone is roughly parallel to the inner surface of conical intermediate portion 10. Together these elements form tapered surfaces for maintaining approximately uniform surge impedance through the joint as the small diameter conductors of the cable merge with the larger ones of the joint. The metallic cone 16 has an extension 17 with a threaded collar 18. The cone is secured to and electrically connected with the conductor 4 by any suitable means such as solder 19 filling an opening in the cylindrical portion 17. A sleeve 20 is threaded at one end to the threaded collar 18 of the cone 16. Each of the two terminals on the two lengths of cable to be connected together has the elements 16 to 20 described above. The sleeves 20 of the two terminals are electrically connected by means of a connecting member 21 which has an end portion 22 disposed within one of the sleeves 20 and preferably brazed or fused thereto. The connecting member 21 has an intermediate portion or collar located between and forming abutments for the adjacent ends of the sleeves 20 of the terminals. The connecting member in addition has a slotted cylindrical portion 23 forming a snug fit in the other of the sleeves 20 so that a good electrical connection is obtained between the sleeves.

The casings 8 of the terminals are electrically and mechanically securely connected together by a suitable coupling. In the present example, the casing 8 of the left-hand terminal is provided with a flanged extension 24 secured to the casing by suitable means such as solder 25. The casing 8 of the right-hand terminal is provided with another flanged extension 26 suitably secured to the casing. The flanged extensions are sealed together by means including a packing ring 27 and a flanged nut 28.

The solid dielectric 6 has a conical end face or boundary 29 and is held in position in tight sealing engagement with the outer conductor or casing by means of a sealing gasket 30 engaging the outer end portion of the solid dielectric and held in position by a retaining ring 31. The retaining ring itself is held in position by a spun-in projection 32 of the casing. The sleeves 20 of the two terminals and the intermediate portion of the connecting member 21 form a substantially continuous cylindrical surface concentric within the inner cylindrical surface of the end portions 11 and the flanges 24, 26 of the terminals, the latter constituting part of the outer conductor. Preferably, the annular space 33 formed between the inner and outer conductors of the connector 3 is filled with a gaseous dielectric such as air. However, it will be apparent that other gases may be used, such as nitrogen. Also in certain instances, the space 33 might be filled with insulating compound having high dielectric strength, for example, polystyrene.

As aforementioned, the boundary surface 29 makes an angle with the dielectric media of the cable and joint such that $$\tan A = \sqrt{\frac{K_1}{K_2}} \text{ and } \cot B = \sqrt{\frac{K_1}{K_2}}$$

As shown by Fig. 1, the angles A and B are measured from a line normal or perpendicular to the boundary line 29 of the solid dielectric material. The solid dielectric as far as it engages directly the cylindrical conductor 4 has a constant inner diameter. Adjacent the metallic cone 16 the diameter of the solid dielectric increases gradually and reaches a maximum at or near the base of the metallic cone 16. In other words, the inner surface of the solid dielectric is substantially conical within the cable connector or terminal and has a tangent approach to the cylindrical inner surface of the solid dielectric in the cable section. The outer surface of the solid dielectric in the connector is likewise substantially conical with slightly curved contour and a diameter increasing toward the end of the cable. The inner and outer curvatures of the solid dielectric should be as small as possible. Practical considerations limit the length of the conical surfaces. The outer diameter of the inner cylindrical conductor and the inner diameter of the outer cylindrical conductor of the connector are chosen to produce with the chosen dielectric a uniform surge impedance equal to that of the solid cable section.

If an electric wave is considered approaching the boundary from the solid side, it is desirable, from a theoretical standpoint, that the wave approach the boundary at the angle of incidence B, as indicated in the diagrammatic showing of Fig. 7. If this were to happen, it would mean that the contours of the inner and outer cones of the concentric conductors should approach the boundary at the same angle in order to cause the electric wave to approach at the desired angle. However, from a practical standpoint, it is not possible to have both the inner and outer cones approach the boundary at the same angle because considerations of substantially constant surge impedance require that the two curves of the cones diverge. Although it is necessary to make the cones diverge, it is possible to reduce the undesirable effect of the divergence by making the two cones diverge from the desired angle of incidence by equal amounts and in opposite directions so that the average of the directions of the two cones will be substantially correct. This would mean that the average angle of incidence of an electric wave would be correct. The cable joint thus far described is constructed by the new and improved method and apparatus comprising my invention.

During manufacture of a cable joint or terminal according to my invention, the jacket 7 is stripped back from the end portion of a cable (Fig. 2). Thereupon the gland nut 15, washers 14 and gaskets 13 are passed over the jacket 7 and the braid clamp 12 is passed over the outer conductor 5 and wedged under the jacket 7. The braid 5, forming the outer conductor of the cable, is then turned outwardly to form a flange around the braid clamp 12. The casing 8 is then passed over the cable end portion. The gland nut 15 is tightened to form a weather-proof seal between the casing 8 and the jacket 7 of the cable section. In the present instance the inner conductor 4 and the solid dielectric 6 on the end portion extend axially beyond the casing 8. The terminal parts thus far assembled are then placed into a molding press to mold the dielectric material on the end portion into the desired shape.

The press to accomplish this, as shown in part in Fig. 2 and in full in Fig. 5, comprises a cylinder 34 forming a molding chamber. An inlet channel 35 connected to a pipe 36 and an exhaust port 37 permits a heating medium, such as hot air, to be circulated in the cylinder 34 during the molding operation. The cylinder 34 has a threaded end portion mounted on a supporting plate 38 and forming an inner annular shoulder 39. The supporting plate 38 is connected to an end plate 40 (Fig. 5) by means of four rods 41. A plunger 42 is slidable into the right-hand end of the cylinder 34 and has an end face 43 which conforms to the predetermined shape of the boundary or end face 29 (Fig. 1) to be produced. The plunger has a vent channel 44 for discharging gases as the plunger passes beyond the exhaust opening 37 and for discharging some of the molded dielectric compound during the molding operation (Fig. 3), for a purpose to be described later.

As shown by Figure 5, the right-hand end of the plunger is secured to a threaded sleeve 45 and a plate 46 slidably engaging the rods 41 and acting as a guide for the plunger on said rods. The plunger is actuated, that is, moved axially by means of a screw 47 connected at its right-hand end to a handle 48 and having screw engagement with the end plate 40. The left-hand end of the screw 47 has a head 49 supported within the sleeve 45 by means of a ball-bearing 50 and is loosely connected to the plunger 42 by a slidable cup 51 and a compression spring 52. Upon clockwise rotation of the handle 48 the screw 47 is moved toward the left. This movement is transmitted through the spring 52 to the plunger 42. The spring normally acts as a shock absorber to effect uniform transmission of force from the screw to the cylinder. As the resistance to movement of the plunger increases during the molding operation the spring is compressed until the cup 51 engages directly the end face of the plunger 42, the spring then being completely enclosed within a bore in the plunger.

The left-hand end of the plunger 42 has a shoulder 53 for supporting the base of the metallic cone 16. In some instances it may be desirable to use a special steel cone of same shape as the cone 16 for the molding operation. During the molding operation a cone 16 is inserted into the end of the plunger and a cable with a terminal casing is assembled on the tool as shown in Figs. 2 and 5. The casing 8 of the terminal is then seated against the shoulder 39 of the cylinder 34.

As shown in the exploded view of Fig. 6, the molding press includes means for clamping in position a cable with a terminal casing thereon. This means includes a cylinder 54 having a threaded portion secured to an anchor plate 55 held on the supporting plate 38 by means of two spaced rods 56. The cable projects centrally through the cylinder and is engaged by means of a three-part clamp 57 bearing against thrust plate 58 provided with a conical opening 59. The thrust plate is seated against the right-hand end of the cylinder 54 and has an opening 60 for accommodating one of the rods 56 and a recess 61 for accommodating the other rod 56. The rod 56 projects through the opening 60 of the thrust plate and constitutes a pivot for the latter; that is, the thrust plate may be swung into position about the rod 56 so that the other rod 56 slips into recess 61.

During assembly a cable with a terminal casing thereon is inserted through the cylinder 54. Thereupon the three parts of the clamp 57 are positioned about the cable. Then the thrust plate 58 is moved into position to support the clamp and finally the threaded cylinder 54 is rotated toward the thrust plate 58 in order to force the thrust plate 58 up around the clamp which, in turn, engages the terminal casing.

During construction of the joint, it is desirable to strip the cable in a manner such that the amount of compound left on the end portion is sufficient to produce the enlarged conical end portion of the dielectric. In some cases where the volume of compound on the end of the conductor is not sufficient, additional compound may be placed into the casing in the form of a ring or insulation pellet 62 as shown in Fig. 4. This additional compound is to be of the same dielectric material as that on the cable.

During the molding operation, hot air or like heating medium, is admitted through the pipe 36 to the cylinder 34 to heat the insulation until it reaches a certain temperature, for example, 110° C. in case such insulation or dielectric is made from polyethylene. Thereupon the plunger 42 is slowly advanced by rotating the handle 48. As the plunger advances, the cone 16 peels back the dielectric medium on the cable, and together with the angular end face 43 on the plunger, forces the insulation into the tapered section 10 of the terminal casing.

Although the molding press and the dielectric compound on the cable are heated during the initial stages of the molding operation, it is important that the dielectric compound be completely cooled upon completion of the operation. This is so because the dielectric, such as polyethylene, contracts upon cooling and it is extremely important that there be no voids in the dielectric compound after it has been molded into position. For this reason, during the latter stages of the molding operation, the terminal and molding press near the cable end of the construction are cooled by means of a water bath.

Since the dielectric compound shrinks on cooling, it is important for the operator to know whether or not the plunger of the molding press is being moved fast enough to make up for any shrinkage in the compound to prevent the formation of voids. This is the purpose of the channel 44. As the plunger is advanced, compound is forced out through the passage 44, in the manner indicated by Fig. 3. If the excess compound were allowed to creep out of the molding press along clearances between the plunger 42 and the cylinder 34, the operator would not be sure that the plunger was being advanced at the proper rate because a considerable amount of the dielectric compound might accumulate out of sight in the space between these two members. However, by providing the channel 44, the operator can immediately ascertain whether or not the plunger is being moved at the proper rate because the excess compound is always visible.

During the molding operation, the operator should move the plunger 42 fast enough so that material is continuously extruded through the channel 44 during the entire molding cycle. Moreover, it will be apparent that the rate at which material is extruded out of the channel 44 will give the operator an indication as to whether or not the plunger is being moved at the proper speed. If the plunger is moved too fast during the initial stages of the molding cycle, then an excess of dielectric compound will be extruded through the channel 44 giving an indication to the operator to decrease the speed of the plunger. On the other hand, during the latter stages of the molding cycle when the dielectric compound is being cooled down and shrunk, if no compound is extruded through the channel 44, then the operator will know that the plunger 42 is not being advanced fast enough. Under ideal conditions, the press should be operated in such a way that the plunger reaches its final position at a time when the insulation has become thoroughly cooled and shrunk and the plunger should be operated so that the dielectric compound is extruded through the channel 44 continuously during movement of the plunger. When this procedure is followed, it is practically certain that there will be no voids in the molded insulation of the terminal.

Upon completion of the molding operation, the terminal casing is removed from the press and the gasket 30 is inserted together with the retaining ring 31. The gasket 30 is held in position by application of pressure on the retaining ring and then a projection is spun in the cylindrical casing 8 to hold the retaining ring 31 in position. The projection 32 may be formed by rotating the terminal casing on a mandrel. Alternatively, the terminal casing may be held fast and a suitable forming tool rotated around the periphery of the casing. Finally, the metal cone 16 is secured to the inner conductor by any suitable means such as the solder 19. Then the coupling member 24 or 26 is fastened to the terminal casing 8.

Thus, with my invention I have accomplished an improved apparatus for making cable connectors in which reflection of high frequency waves in the cable is substantially eliminated and whereby the characteristic or surge impedance remains substantially constant throughout the cable lengths and joint. The method of attaching the connectors to the cable is one which may be performed equally as well in the field as in the factory. Connectors constructed in accordance with my invention are simple in construction and are especially suitable for making joints in field use.

While I have, in accordance with the patent statutes, shown and described a particular embodiment of my invention, other changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. A tool for forming cable connections comprising a cylinder having an inlet for heating medium and an exhaust, a plunger with a conical end face slidably extending into one end of the cylinder, means for actuating the plunger to force it into the cylinder, and means for supporting a cable section with a terminal on the other end of the cylinder.

2. A tool for forming cable connections comprising a cylinder having an inlet for heating medium and an exhaust, a plunger with a conical end face slidably extending into one end of the cylinder, means for actuating the plunger to force it into the cylinder, and means for supporting a cable section on the other end of the cylinder, said plunger having a central recess in its conical surface for supporting a metallic cone and a vent in its wall through which molded material may be extruded.

3. A tool for forming cable connections comprising a cylinder, means for supporting a cable section on one end of the cylinder, a plunger extending into said cylinder from the other end and being adapted to mold compound around the cable section, said plunger being provided with an opening therein through which part of the molded compound is extruded as the plunger is moved toward the cable section.

LYNN WETHERILL.

REFERENCES CITED

The following references are of record in the file of this patent:

UNITED STATES PATENTS

| Number | Name | Date |
| --- | --- | --- |
| 369,505 | Drescher | Sept. 6, 1887 |
| 2,135,330 | Benge | Nov. 1, 1938 |
| 2,163,798 | Mucher | June 27, 1939 |